United States Patent
Wang

(10) Patent No.: US 9,081,773 B2
(45) Date of Patent: Jul. 14, 2015

(54) DATA SOURCE SEARCHING SYSTEM AND METHOD THEREOF

(75) Inventor: Peng Wang, Shenzhen (CN)

(73) Assignees: Fu Tai Hua Industry (Shenzhen) Co., Ltd., Shenzhen (JP); HON HAI PRECISION INDUSTRY CO., LTD., New Taipei (TW)

( * ) Notice: Subject to any disclaimer, the term of this patent is extended or adjusted under 35 U.S.C. 154(b) by 324 days.

(21) Appl. No.: 13/592,358

(22) Filed: Aug. 23, 2012

(65) Prior Publication Data

US 2013/0173661 A1   Jul. 4, 2013

(30) Foreign Application Priority Data

Dec. 28, 2011   (CN) .......................... 2011 1 0448809

(51) Int. Cl.
*G06F 17/30* (2006.01)

(52) U.S. Cl.
CPC .......... *G06F 17/30* (2013.01); *G06F 17/30194* (2013.01)

(58) Field of Classification Search
CPC ................... G06F 17/30194; G06F 17/30067; G06F 17/30312; G06F 17/30283
USPC .......................... 707/640, 654, 969, 770, 827
See application file for complete search history.

(56) References Cited

U.S. PATENT DOCUMENTS

| | | | |
|---|---|---|---|
| 7,574,496 B2 * | 8/2009 | McCrory et al. ............... | 709/223 |
| 7,991,748 B2 * | 8/2011 | Rowan et al. ................. | 707/677 |
| 8,332,601 B2 * | 12/2012 | Yasuda et al. ................. | 711/162 |
| 8,682,862 B2 * | 3/2014 | Rosikiewicz et al. ......... | 707/679 |
| 2012/0226733 A1 * | 9/2012 | Kim et al. ..................... | 709/201 |

* cited by examiner

*Primary Examiner* — Monica Pyo
(74) *Attorney, Agent, or Firm* — Novak Druce Connolly Bove + Quigg LLP

(57) ABSTRACT

The disclosure provides a data source searching system and a method adapted for the system. The system includes a number of cloud servers which store data. The system acquires creation time of the data in each cloud server in response to a command for searching data source of the data. A time zone of each cloud server is acquired. The system compares all creation time of the data in all cloud servers based on the time zones to determine which creation time of the data is in fact the earliest among all compared cloud servers and regards the cloud server which stores the data whose creation time is the earliest as the data source of the data.

14 Claims, 6 Drawing Sheets

DATA SOURCE SEARCHING SYSTEM AND METHOD THEREOF

BACKGROUND

1. Technical Field

The disclosure relates to searching systems and, more particularly, to a data source searching system and a data source searching method adapted for the system.

2. Description of Related Art

Different cloud servers may store a replicated data. A method of related art for determining which cloud server stores the original or earliest-replicated data earliest may include steps of: obtaining creation time of the data in different cloud servers, wherein the creation time of the data is dependent on the system time of each cloud server; directly comparing the obtained creation time of the data in the cloud servers; and regarding the cloud server which stores the data whose creation time is the earliest as the data source of the replicated data. However, because the creation time of the data is generated according to the system time of each cloud server, it may be inaccurate due to time zone differences among the cloud servers.

Therefore, what is needed is a data source searching system to overcome the described shortcoming.

DETAILED DESCRIPTION

Figure 1:
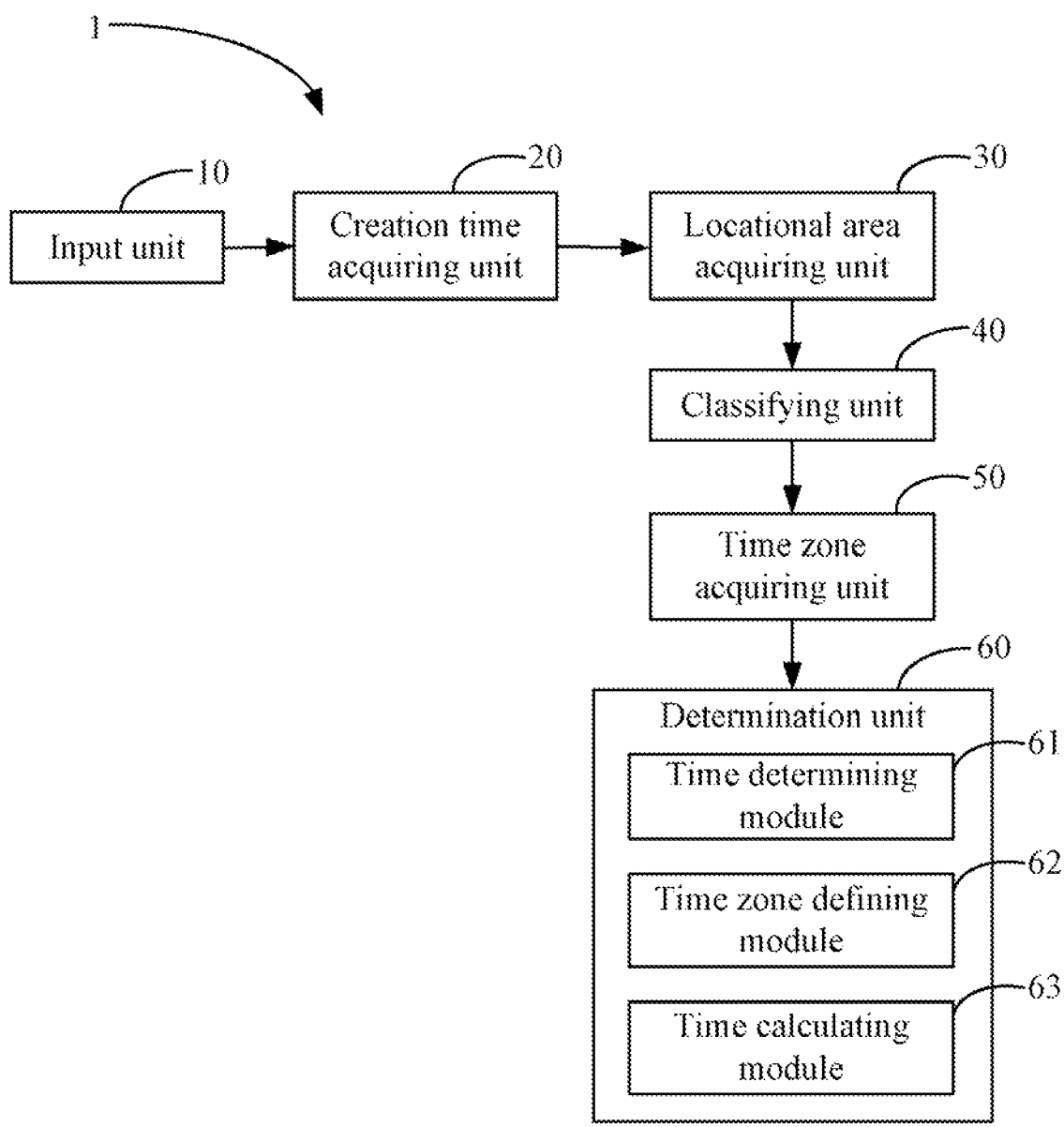
FIG. 1 is a block diagram of a data source searching system in accordance with an exemplary embodiment.

FIG. 1 is a block diagram of a data source searching system in accordance with an exemplary embodiment. The data source searching system (hereinafter "the system") 1 is applied on a number of cloud servers. Each one of the number of cloud servers is connected via network and may be distributed internationally. Each cloud server stores data to provide network resources for users and records creation time of the data according to current time of the cloud server. If the data stored in a cloud server is created by the cloud server itself, the cloud server is regarded as a data source of the data. If the data stored in a second cloud server is loaded from a first cloud server, the creation time of the data in the second cloud server is the time when the data was loaded from the first cloud server.

The system 1 includes an input unit 10, a creation time acquiring unit 20, a locational area acquiring unit 30, a classifying unit 40, a time zone acquiring unit 50, and a determination unit 60.

The input unit 10 generates commands in response to user inputs. In the embodiment, the commands include a command for searching for a data source of data. The creation time acquiring unit 20 acquires the creation time of the data in each cloud server when the input unit 10 generates the command for searching for a data source of the data. For example, there are five cloud servers which store the data and the respective creation times of the data in the five cloud servers are 11 am, 12 am, 1 pm, 2 pm, and 3 pm.

The locational area acquiring unit 30 acquires a locational area of each cloud server, such as Beijing and Tokyo areas. As is well known, each locational area is allocated with and identified by a network domain, and the network domain has a number of IP addresses allocated to it. Thus, if an IP address of one cloud server is acquired and determined, the locational area acquiring unit 30 acquires the network domain based on the corresponding IP address and obtains the locational area of each cloud server based on the corresponding network domain. In another embodiment, the locational area acquiring unit 30 is a positioning unit for generating locational information of each cloud server and acquiring the locational area of each cloud server based on the corresponding locational information.

The time zone acquiring unit 50 acquires a time zone of each cloud server based on the locational area from the locational area acquiring unit 30. The determination unit 60 further includes a time determining module 61, a time zone defining module 62, and a time calculating module 63.

Figure 2:
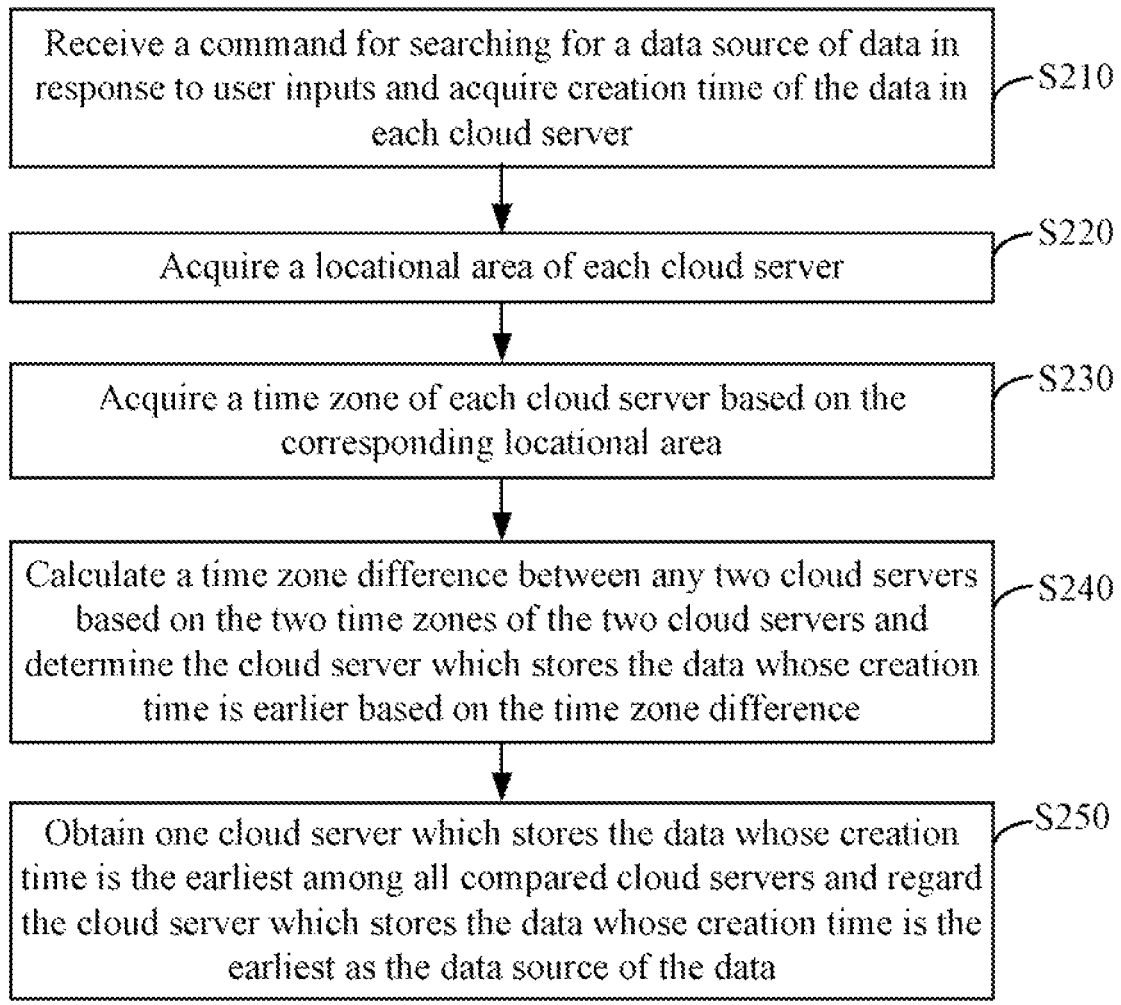
FIG. 2 is a flowchart of a method of searching for a data source of data adapted for the system of FIG. 1 in accordance with a first exemplary embodiment.

All units and modules are described in FIGS. 2-3 and 5-6. In the first exemplary embodiment, as shown in FIG. 2, in step S210, the creation time acquiring unit 20 acquires the creation time of the data in each cloud server when receiving a command for searching for the data source of the data, in response to user inputs from the input unit 10. In step S220, the locational area acquiring unit 30 acquires a locational area of each cloud server. In step S230, the time zone acquiring unit 50 acquires the time zone of each cloud server based on the corresponding locational area.

In step S240, the time determining module 61 calculates a time zone difference between any two cloud servers based on the two time zones of the two cloud servers and determines the cloud server which stores the data whose creation time is earlier based on the time zone difference. In step S250, the time determining module 61 further obtains the cloud server which stores the data whose creation time is the earliest among all compared cloud servers and regards the cloud server which stores the data whose creation time is the earliest as the data source of the data.

For example, when the time determining module 61 compares two time zones of any two cloud servers, each cloud server is compared once. If there are four cloud servers which store the data, such as "a" in Beijing, "b" in Tokyo, "c" in New York, and "d" in London, the creation time of the data in the "a" cloud server might be 10 am on Oct. 10, 2011, the creation time of the data in the "b" cloud server might be 10:30 am on Oct. 10, 2011, the creation time of the data in the "c" cloud server might be 7 am on Oct. 10, 2011, and the creation time of the data in the "d" cloud server might be 8 am on Oct. 10, 2011, all these time being local time.

At first, "a" and "b" cloud servers are compared. In detail, a time zone difference between the "a" cloud server in Beijing and the "b" cloud server in Tokyo is minus one hour to the east, therefore the actual creation time of the data in the "b" cloud server is 9:30 am on Oct. 10, 2011 in relation to the time zone of "a" cloud server, therefore, the time determining module 61 determines that the creation time of the data in "b" cloud server is earlier than the creation time of the data in "a" cloud server.

Then "c" and "d" cloud servers are compared. In detail, a time zone difference between "c" cloud server in New York and "d" cloud server in London is plus five hours to the west, therefore the creation time of the data in "c" cloud server is 7 am (plus five hours equals to 1 pm) on Oct. 10, 2011 in relation to the time zone of "d" cloud server, therefore, the time determining module 61 determines that the creation time of the data in "d" cloud server is earlier than the creation time of the data in "c" cloud server.

At last, "b" and "d" cloud servers are compared. In detail, a time zone difference between "b" cloud server in Tokyo and "d" cloud server in London is nine hours, the creation time of the data in the "d" cloud server is 8 am local time (plus nine hours equals to 1 pm) on Oct. 10, 2011 in relation to "b" cloud server, therefore, the time determining module 61 determines that the creation time of the data in "b" cloud server is earlier than the creation time of the data in "d" cloud server, therefore, the creation time of the data in "b" cloud server is the earliest and "b" cloud server is regarded as the data source of the data.

Figure 3:
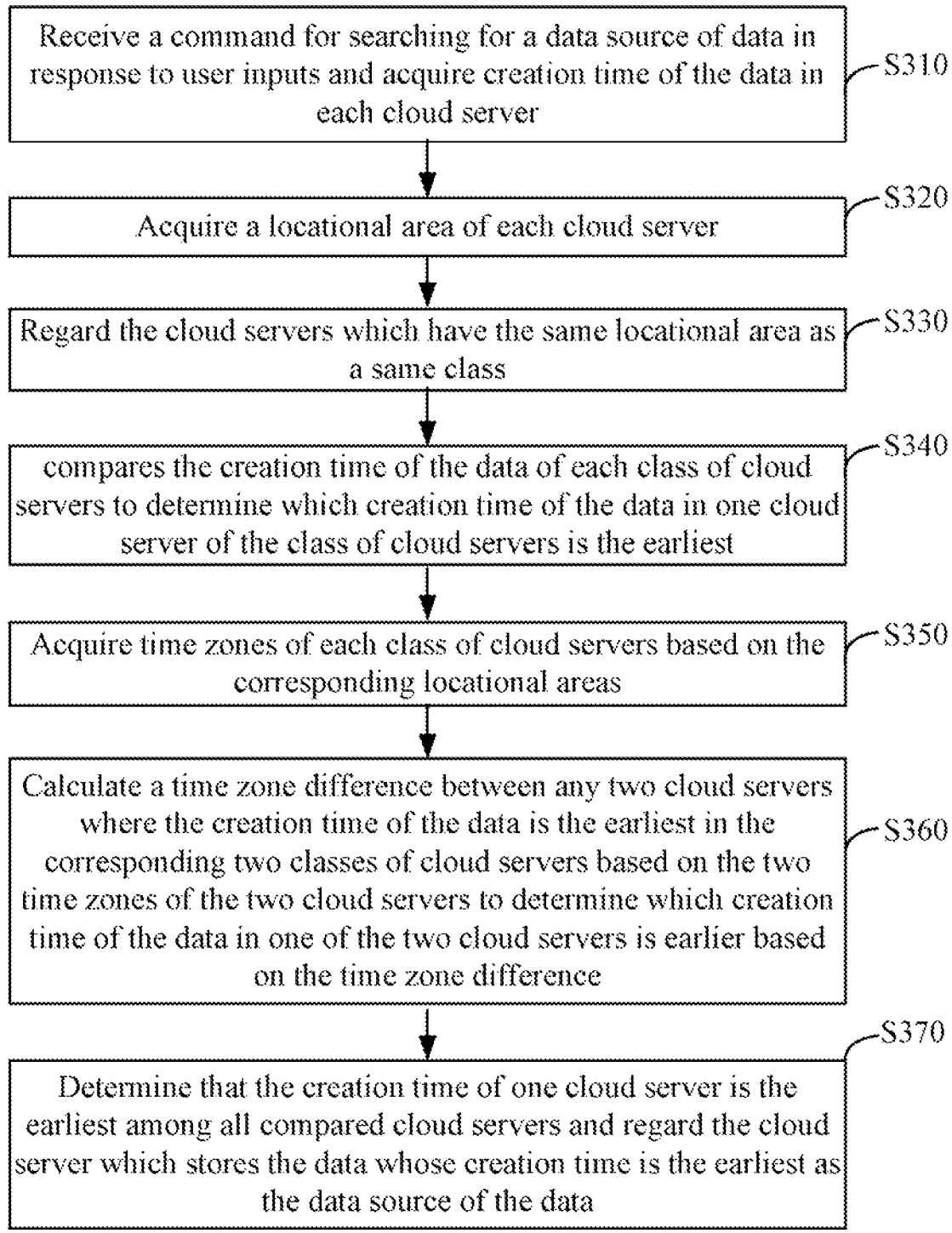
FIG. 3 is a flowchart of a method of searching for a data source of data adapted for the system of FIG. 1 in accordance with a second exemplary embodiment.
Figure 4:
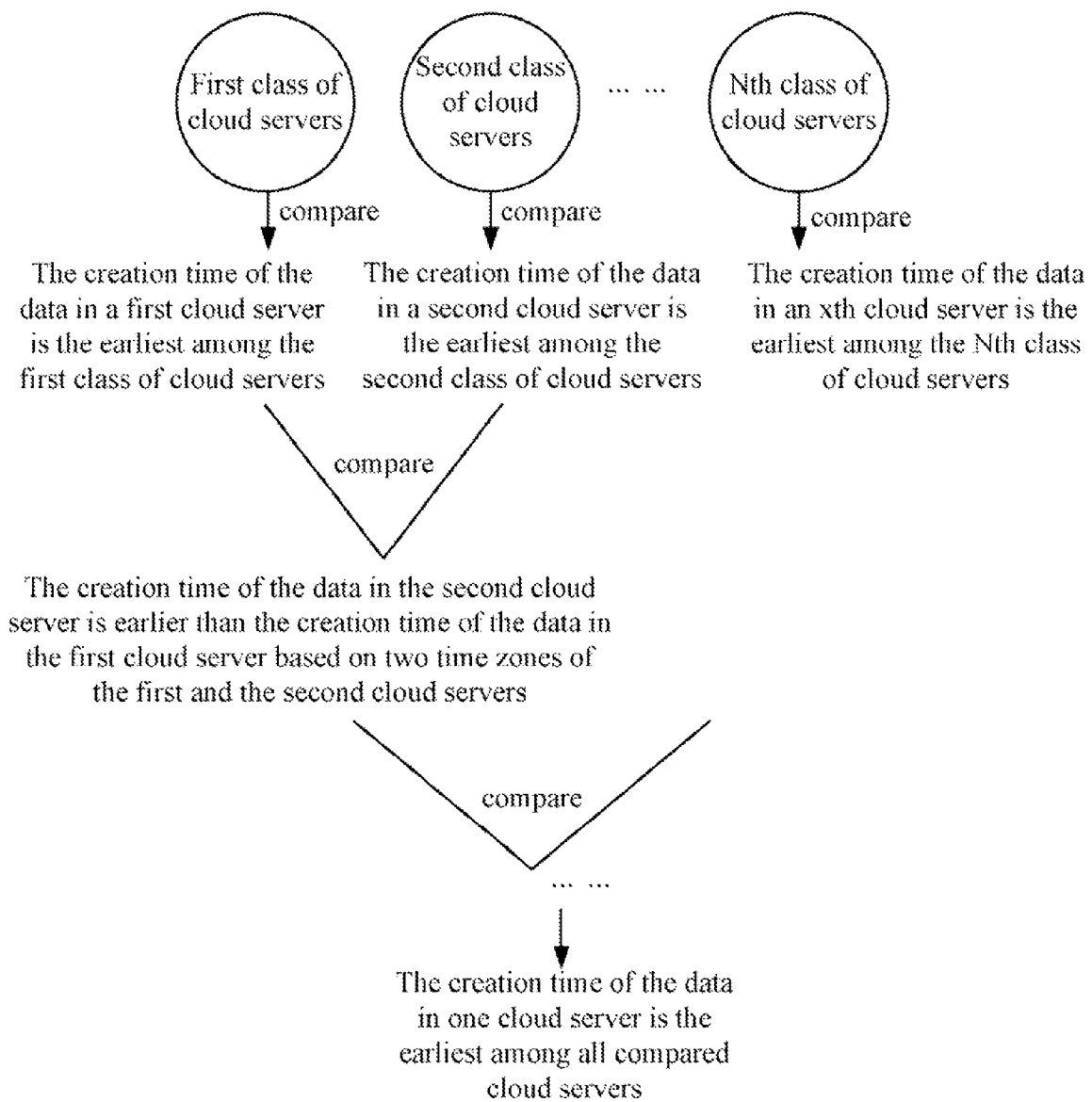
FIG. 4 is a schematic view of accomplishing the method of FIG. 3.

In the second exemplary embodiment, as shown in FIG. 3, steps S310 and S320 are the same as steps S210 and S220 of FIG. 2 respectively. In step S330, the classifying unit 40 regards the cloud servers which have the same locational area as a same class, such as a first class, a second class, etc. as in FIG. 4, for example, the cloud servers in Beijing are regarded as a class. In step S340, the time determining module 61 compares the creation time of the data in each class of cloud servers to determine which creation time of the data in one cloud server of the class of cloud servers is the earliest, such as a first cloud server of the first class, a second cloud server of the second class, etc. as in FIG. 4. In step S350, the time zone acquiring unit 50 acquires time zones of each class of cloud servers based on the locational areas.

In step S360, the time determining module 61 calculates a time zone difference between any two cloud servers where the creation time of the data is the earliest in the corresponding two classes of cloud servers based on the two time zones of the two cloud servers to determine which creation time of the data in one of the two cloud servers is earlier based on the time zone difference, for example, the two cloud servers are the "a" cloud server in Beijing and the "b" cloud server in Tokyo, and the time zone difference between the "a" cloud server in Beijing and the "b" cloud server in Tokyo is minus one hour to the east. In step S370, the time determining module 61 determines that the creation time of one cloud server is the earliest among all compared cloud servers and regards the cloud server which stores the data whose creation time is the earliest as the data source of the data.

Figure 5:
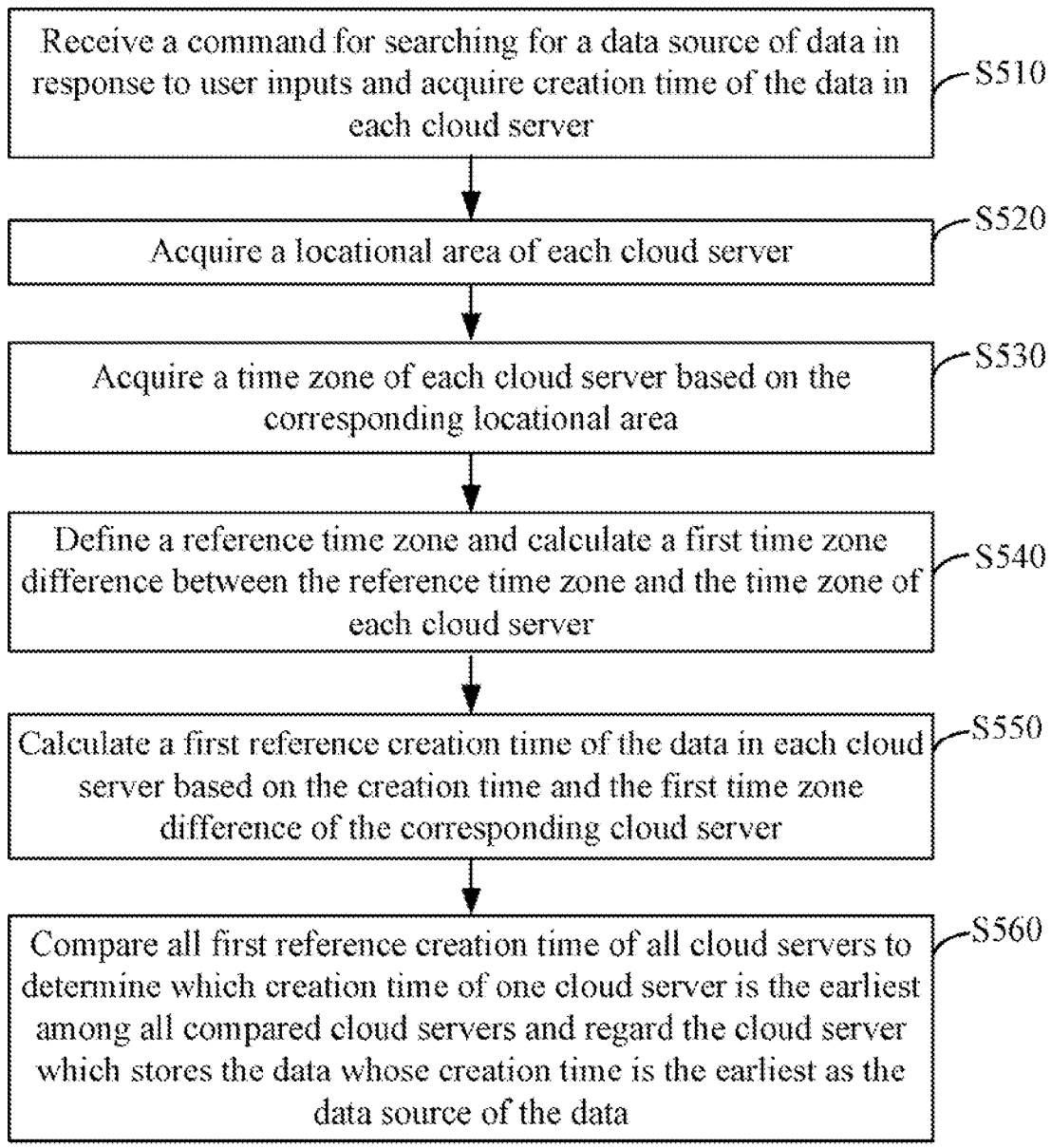
FIG. 5 is a flowchart of a method of searching for a data source of data adapted for the system of FIG. 1 in accordance with a third exemplary embodiment.

In the third exemplary embodiment, as shown in FIG. 5, steps S510, S520, and S530 are the same as steps S210, S220, and S230 of FIG. 2 respectively. In step S540, the time zone defining module 62 defines a reference time zone and the time calculating module 63 calculates a first time zone difference between the reference time zone and the time zone of each cloud server, for example, the time zone of Beijing is defined as the reference time zone. In step S550, the time calculating module 63 further calculates a first reference creation time of the data in each cloud server based on the creation time and the first time zone difference of a first cloud server, for example, if the first cloud server is in Beijing, the first reference creation time is equal to the creation time of the data, and if the first cloud server is in Tokyo and the creation time of the data in the first cloud server is 10:30 am on Oct. 10, 2011, the first reference creation time of the data in the first cloud server is 9:30 am on Oct. 10, 2011 because of the one hour time zone difference between Beijing and Tokyo. In step S560, the time determining module 61 compares all first reference creation times of all cloud servers to determine which creation time of any one cloud server is the earliest among all compared cloud servers and regards the cloud server which stores the data whose creation time is the earliest as the data source of the data.

Figure 6:
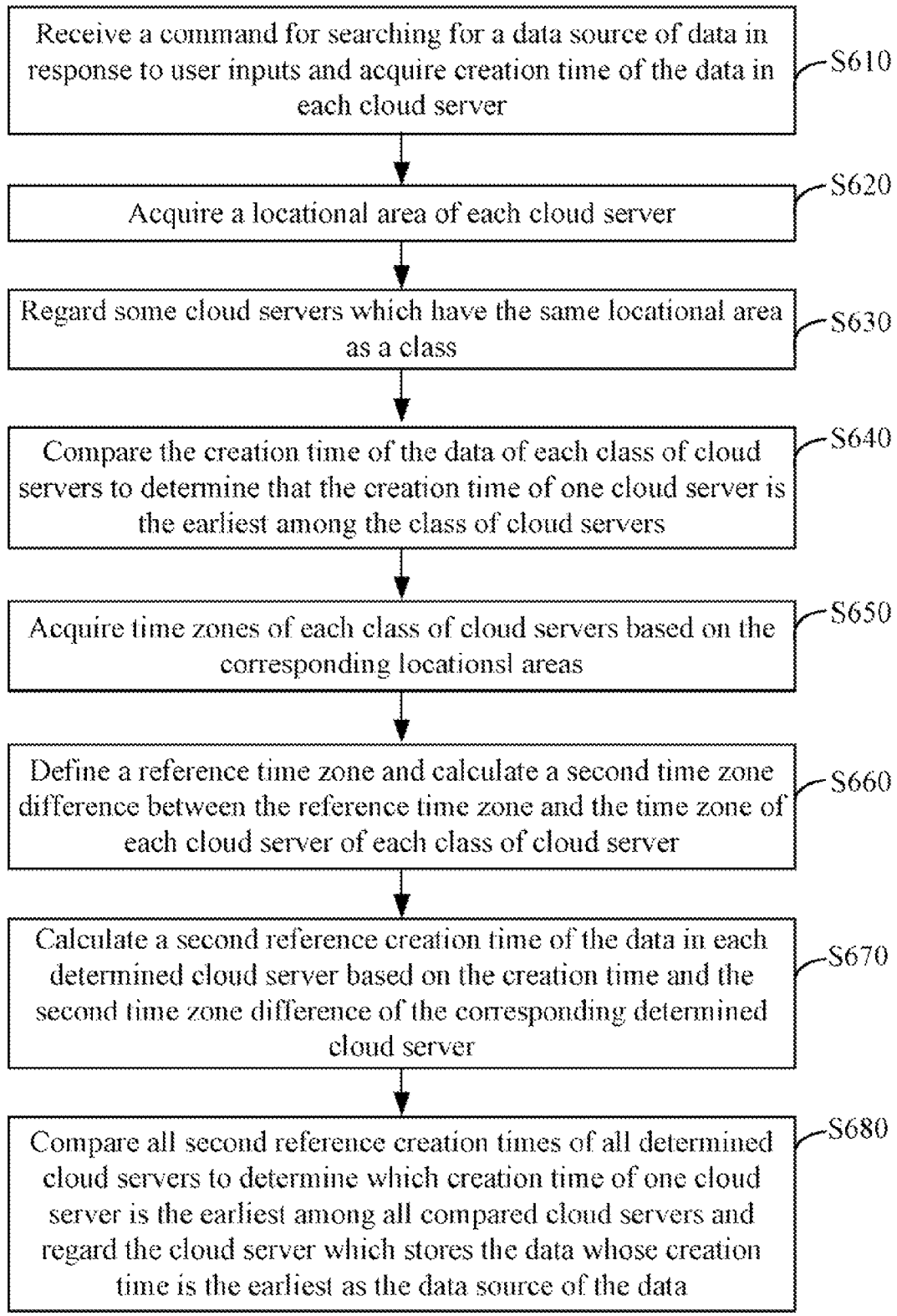
FIG. 6 is a flowchart of a method of searching for a data source of data adapted for the system of FIG. 1 in accordance with a fourth exemplary embodiment.

In the fourth exemplary embodiment, as shown in FIG. 6, steps S610 and S620 are the same as steps S210 and S220 of FIG. 2 respectively, and steps S630, S640, and S650 are the same as steps S330, S340, and S350 of FIG. 3 respectively. In step S660, the time zone defining module 62 defines a reference time zone, and the time calculating module 63 calculates a second time zone difference between the reference time zone and the time zone of each cloud server of each class of cloud servers. In step S670, the time calculating module 63 further calculates a second reference creation time of the data in each determined cloud server based on the creation time and the second time zone difference of the determined cloud server. In step S680, the time determining module 61 compares all second reference creation times of all determined cloud servers to determine which creation time is the earliest among all compared cloud servers and regards the cloud server which stores the data whose creation time is the earliest as the data source of the data.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A data source searching system, wherein the system is applied on a plurality of cloud servers, and the plurality of cloud servers are connected each other via network and store data, the system comprising:

an input unit to generate a command for searching for a data source of data in response to user inputs;

a creation time acquiring unit to acquire creation time of the data in each of the plurality of cloud servers in response to the command from the input unit;

a locational area acquiring unit to acquire a locational area of each of the plurality of cloud servers;

a time zone acquiring unit to acquire a time zone of each of the plurality of cloud servers based on the corresponding locational area from the locational area acquiring unit; and a determination unit to determine one of the plurality of cloud servers, which stores the data whose creation time is the earliest among the plurality of cloud servers based on the acquired time zone of each of the plurality of cloud servers, as the data source of the data, wherein the determination unit further calculates a reference creation time of the data in each determined cloud server based on the creation time and the time zone difference of the corresponding determined cloud server, compare all reference creation time of the data in all determined cloud servers to determine which creation time of the data in one cloud server is the earliest among all compared cloud servers, and regard the cloud server which stores the data whose creation time is the earliest as the data source of the data.

2. The data source searching system as recited in claim 1, wherein the locational area acquiring unit acquires an IP address of each of the plurality of cloud servers and a network domain based on the corresponding IP address, and obtains the locational area of each of the plurality of cloud servers based on the corresponding network domain.

3. The data source searching system as recited in claim 1, wherein the locational area acquiring unit is a positioning unit for generating locational information of each of the plurality of cloud servers and acquiring the locational area of each of the plurality of cloud servers based on the corresponding locational information.

4. The data source searching system as recited in claim 1, further comprising a classifying unit for regarding the cloud servers which have the same locational area as a same class, wherein the determination unit is further configured to compare the creation time of the data of each class of cloud servers to determine that the creation time of the data in one cloud server is the earliest in the class of cloud servers.

5. The data source searching system as recited in claim 4, wherein the time zone acquiring unit is configured to acquire the time zone of each class of cloud servers based on the corresponding locational area, the determination unit is configured to determine a reference time zone and calculate a time zone difference between the reference time zone and the time zone of each cloud server of each class of cloud servers.

6. The data source searching system as recited in claim 1, wherein the determination unit is configured to calculate a time zone difference between any two cloud servers based on the two time zones of the two cloud servers, and determine which creation time of the data in one of the two cloud servers is earlier based on the time zone difference, further determine that the creation time of one cloud servers is the earliest among all compared cloud servers, and regard the cloud server which stores the data whose creation time is the earliest as the data source of the data.

7. The data source searching system as recited in claim 1, wherein the determination unit is configured to define a reference time zone and calculate a time zone difference between the reference time zone and the time zone of each of the plurality of cloud servers, calculate a reference creation time of the data in each of the plurality of cloud servers based on the creation time and the time zone difference of the corresponding cloud server, and compare all reference creation time of the data in all the plurality of cloud servers to determine which creation time of one cloud server is the earliest among all compared cloud servers, and the determination unit is further configured to regard the cloud server which stores the data whose creation time is the earliest as the data source of the data.

8. A data source searching method for a system, wherein the system is applied on a plurality of cloud servers, and the plurality of cloud servers are connected each other via network and store data, the method comprising:
   acquiring creation time of the data in each of the plurality of cloud servers in response to user inputs;
   acquiring a locational area of each of the plurality of cloud servers;
   acquiring a time zone of each of the plurality of cloud servers based on the corresponding locational area; and
   determining one of the plurality of cloud servers, which stores the data whose creation time is the earliest among the plurality of cloud servers based on the acquired time zone of each of the plurality of cloud severs, as the data source of the data;
   calculating a reference creation time of the data in each determined cloud server based on the creation time and the time zone difference of the corresponding determined cloud server;
   comparing all reference creation time of the data in all determined cloud servers to determine which creation time of the data in one cloud server is the earliest among all compared cloud servers; and regarding the cloud server which stores the data whose creation time is the earliest as the data source of the data.

9. The data source searching method as recited in claim 8, the step "acquiring a locational area of each of the plurality of cloud servers" comprising:

acquiring an IP address of each of the plurality of cloud servers and a network domain based on the corresponding IP address; and
obtaining the locational area of each of the plurality of cloud servers based on the corresponding network domain.

10. The data source searching method as recited in claim 8, the step "acquiring a locational area of each of the plurality of cloud servers" comprising:
   obtaining locational information of each of the plurality of cloud servers and acquiring the locational area of each of the plurality of cloud servers based on the corresponding locational information.

11. The data source searching method as recited in claim 8, after the step "acquiring a locational area of each of the plurality of cloud servers" comprising:
   regarding the cloud servers which have the same locational area as a same class; and
   comparing the creation time of the data of each class of cloud servers to determine that the creation time of the data in one cloud server is the earliest in the class of cloud servers.

12. The data source searching method as recited in claim 11, further comprising:
   acquiring the time zone of each class of cloud servers based on the corresponding locational area;
   defining a reference time zone and calculating a time zone difference between the reference time zone and the time zone of each cloud server of each class of cloud servers.

13. The data source searching method as recited in claim 8, the step "determining one of the plurality of cloud servers, which stores the data whose creation time is the earliest among the plurality of cloud servers based on the acquired time zone of each of the plurality of cloud severs, as the data source of the data" comprising:
   calculating a time zone difference between any two cloud servers based on the two time zones of the two cloud servers and determining which creation time of the data in one of the two cloud servers is earlier based on the time zone difference; and
   determining which creation time of one cloud server is the earliest among all compared cloud servers; and
   regarding the cloud server which stores the data whose creation time is the earliest as the data source of the data.

14. The data source searching method as recited in claim 8, the step "determining one of the plurality of cloud servers, which stores the data whose creation time is the earliest among the plurality of cloud servers based on the acquired time zone of each of the plurality of cloud severs, as the data source of the data" comprising:
   defining a reference time zone and calculating a time zone difference between the reference time zone and the time zone of each of the plurality of cloud servers;
   calculating a reference creation time of the data in each of the plurality of cloud servers based on the creation time and the time zone difference of the corresponding cloud server; and
   comparing all reference creation time of all the plurality of cloud servers to determine which creation time of the data in one cloud server is the earliest among all compared cloud servers; and
   regarding the cloud server which stores the data whose creation time is the earliest as the data source of the data.

* * * * *